(12) United States Patent
Ravi et al.

(10) Patent No.: US 7,482,309 B2
(45) Date of Patent: *Jan. 27, 2009

(54) METHODS OF DRILLING WELLBORES USING VARIABLE DENSITY FLUIDS COMPRISING COATED ELASTIC PARTICLES

(75) Inventors: Krishna M. Ravi, Kingwood, TX (US); Donald L. Whitfill, Ponca City, TX (US); B. Raghava Reddy, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 275 days.

This patent is subject to a terminal disclaimer.

(21) Appl. No.: 10/721,055

(22) Filed: Nov. 24, 2003

(65) Prior Publication Data

US 2005/0113262 A1    May 26, 2005

(51) Int. Cl.
*E21B 21/00* (2006.01)
*C09K 8/24* (2006.01)
*B01F 3/12* (2006.01)

(52) U.S. Cl. ............... 507/125; 166/305.1; 175/65; 507/103; 516/77

(58) Field of Classification Search ............... 507/125; 166/305.1; 175/65; 516/77
See application file for complete search history.

(56) References Cited

U.S. PATENT DOCUMENTS

| | | | |
|---|---|---|---|
| 3,145,773 A * | 8/1964 | Jorda et al. ............... 166/290 |
| 3,174,561 A | 3/1965 | Sterrett | |
| 3,231,030 A | 1/1966 | Blom | |
| 3,256,936 A * | 6/1966 | Johnson et al. ............. 166/354 |
| 4,063,603 A | 12/1977 | Rayborn ............... 175/65 |
| 4,234,344 A | 11/1980 | Tinsley et al. ............. 106/88 |
| 4,303,736 A | 12/1981 | Torobin | |
| 4,304,298 A | 12/1981 | Sutton ............... 166/293 |
| 4,340,427 A | 7/1982 | Sutton ............... 106/87 |
| 4,362,566 A | 12/1982 | Hinterwaldner ............. 106/85 |
| 4,367,093 A | 1/1983 | Burkhalter et al. ............. 106/87 |
| 4,370,166 A | 1/1983 | Powers et al. ............. 106/97 |
| 4,450,009 A | 5/1984 | Childs et al. ............. 106/76 |
| 4,450,010 A | 5/1984 | Burkhalter et al. ............. 106/87 |
| 4,460,052 A | 7/1984 | Gockel ............... 175/72 |
| 4,498,995 A | 2/1985 | Gockel ............... 252/8.5 LC |
| 4,506,734 A | 3/1985 | Nolte | |
| 4,565,578 A | 1/1986 | Sutton et al. ............. 106/87 |
| 4,676,317 A | 6/1987 | Fry et al. ............... 166/293 |
| 4,700,780 A | 10/1987 | Brothers ............... 166/293 |
| 4,703,801 A | 11/1987 | Fry et al. ............... 166/293 |
| 4,806,164 A | 2/1989 | Brothers ............... 106/90 |
| 5,124,186 A | 6/1992 | Wycech ............... 428/35.8 |
| 5,456,721 A | 10/1995 | Zandi et al. ............. 106/724 |
| 5,456,751 A | 10/1995 | Zandi et al. | |
| 5,779,787 A | 7/1998 | Brothers et al. ............. 106/802 |
| 5,826,669 A | 10/1998 | Zaleski et al. ............. 175/72 |
| 5,837,739 A | 11/1998 | Nowak et al. ............. 521/54 |
| 5,839,520 A | 11/1998 | Maillet ............... 175/61 |
| 5,959,762 A | 9/1999 | Bandettini et al. ............. 359/265 |
| 6,143,069 A | 11/2000 | Brothers et al. ............. 106/678 |
| 6,197,418 B1 | 3/2001 | Cloots et al. ............. 428/332 |
| 6,279,652 B1 | 8/2001 | Chatterji et al. ............. 166/194 |
| 6,330,916 B1 | 12/2001 | Rickards et al. ............. 166/280 |
| 6,367,549 B1 | 4/2002 | Chatterji et al. ............. 166/292 |
| 6,398,866 B1 | 6/2002 | Wombacher et al. ............. 106/823 |
| 6,457,524 B1 | 10/2002 | Roddy ............... 166/293 |
| 6,508,305 B1 | 1/2003 | Brannon et al. ............. 166/293 |
| 6,518,224 B2 | 1/2003 | Wood ............... 507/118 |
| 6,516,883 B1 | 2/2003 | Chatterji et al. ............. 166/293 |
| 6,527,051 B1 | 3/2003 | Reddy et al. ............. 166/300 |
| 6,530,437 B2 | 3/2003 | Maurer et al. ............. 175/5 |
| 6,545,066 B1 | 4/2003 | Immordino, Jr. et al. | |
| 6,554,071 B1 | 4/2003 | Reddy et al. ............. 166/293 |
| 6,626,991 B1 | 9/2003 | Drochon et al. ............. 106/672 |
| 6,645,288 B1 | 11/2003 | Dargaud et al. ............. 106/696 |
| 6,656,265 B1 | 12/2003 | Garnier et al. ............. 106/713 |
| 6,723,800 B2 | 4/2004 | Srienc et al. ............. 524/450 |
| 6,742,592 B1 | 6/2004 | Le Roy-Delage et al. ... 166/293 |
| 7,004,255 B2 | 2/2006 | Boney ............... 166/280.2 |
| 7,037,881 B2 | 5/2006 | Growcock et al. ............. 507/102 |
| 7,049,272 B2 | 5/2006 | Sinclair et al. ............. 507/230 |
| 7,066,258 B2 | 6/2006 | Justus et al. | |
| 7,108,066 B2 | 9/2006 | Jamison ............... 166/305.1 |

(Continued)

FOREIGN PATENT DOCUMENTS

CA      2 466 549      5/2004

(Continued)

OTHER PUBLICATIONS

Paper entitled "Hawley's Condensed Chemical Dictionary" pp. 922 and 941.

(Continued)

*Primary Examiner*—Timothy J Kugel
(74) *Attorney, Agent, or Firm*—Craig W. Roddy; Baker Botts, LLP.

(57) ABSTRACT

The present invention provides variable density fluid compositions and methods for using such compositions in a subterranean formation. One exemplary embodiment of the variable density fluid compositions of the present invention comprises a variable density fluid comprising: a base fluid; and a portion of elastic particles, the elastic particles having an isothermal compressibility factor in the range of from about $1.5 \times 10^{-3}$ (1/psi) to about $1.5 \times 10^{-9}$ (1/psi).

49 Claims, No Drawings

U.S. PATENT DOCUMENTS

| | | | |
|---|---|---|---|
| 2002/0040079 A1 | 4/2002 | Lee et al. | 524/8 |
| 2002/0108782 A1 | 8/2002 | Boer | 175/7 |
| 2002/0108786 A1 | 8/2002 | Rowden | 175/57 |
| 2004/0007360 A1 | 1/2004 | Leroy-Delage et al. | 166/293 |
| 2004/0142826 A1* | 7/2004 | Nguyen et al. | 507/200 |
| 2004/0144537 A1 | 7/2004 | Reddy et al. | |
| 2004/0162812 A1 | 8/2004 | Lane et al. | |
| 2004/0163812 A1 | 8/2004 | Brothers | 166/293 |
| 2004/0171499 A1* | 9/2004 | Ravi et al. | 507/200 |
| 2004/0211562 A1 | 10/2004 | Brothers et al. | 166/281 |
| 2004/0211564 A1 | 10/2004 | Brothers et al. | 166/293 |
| 2004/0244978 A1 | 12/2004 | Shaarpour | 166/293 |
| 2004/0251026 A1 | 12/2004 | Dargaud et al. | 166/292 |
| 2005/0006095 A1* | 1/2005 | Justus et al. | 166/295 |
| 2005/0019574 A1* | 1/2005 | McCrary | 428/403 |
| 2005/0061206 A1 | 3/2005 | Reddy et al. | |
| 2005/0113262 A1 | 5/2005 | Ravi et al. | 507/125 |
| 2005/0161262 A1 | 7/2005 | Jamison | |
| 2005/0284641 A1 | 12/2005 | Watkins et al. | |
| 2006/0254775 A1 | 11/2006 | Jamison | |
| 2007/0027036 A1 | 2/2007 | Polizzotti et al. | |

FOREIGN PATENT DOCUMENTS

| | | |
|---|---|---|
| DE | 958698 | 2/1957 |
| DE | 32 09 488 | 9/1982 |
| EP | 1 348 831 | 10/2003 |
| FR | 27874411 | 6/2000 |
| GB | 2 354 236 | 3/2001 |
| JP | 49019687 | 5/1974 |
| JP | 56041859 | 4/1981 |
| JP | 01109551 | 4/1989 |
| JP | 05301786 | 4/1992 |
| JP | 09116158 | 5/1997 |
| RU | 2178320 | 1/2002 |
| WO | WO 00/05323 | 2/2000 |
| WO | WO00/20350 | 4/2000 |
| WO | WO 00/47691 | 8/2000 |
| WO | WO 2006/007347 | 1/2006 |
| WO | WO 2006/007347 A2 | 1/2006 |
| WO | WO 2007/145731 | 12/2007 |
| WO | WO 2007/145733 | 12/2007 |
| WO | WO 2007/145734 | 12/2007 |
| WO | WO 2007/145735 | 12/2007 |

OTHER PUBLICATIONS

Paper entitled "Hydration and strength of neat Portland cement" by D. Chandra et al., dated May 12, 1984.
Paper entitled "Small bore hollow waveguides for delivery of 3-.mu.m laser radiation" by R. Kozodoy et al., dated Aug. 14, 1996.
Paper entitled "Energy of dissociation of lipid bilayer from the membrane skelton of red blood cells" by W. Hwang et al., dated Aug. 5, 1997.
Paper entitled "High-peak-power, pulsed CO2 laser light delivery by hollow glass waveguides" by J. Dai et al., dated Oct. 7, 1997.
Paper entitled "A quantitative analysis of single protein-ligan complex separation with the atomic force microscope" by B. Shapiro et al., dated Jan. 27, 1998.
Paper entitled "Force measurements for the movement of a water drop on a surface with a surface tension gradient" by H. Suda et al., dated Mar. 13, 2003.
Paper entitled "Ultrathin glass for flexible OLED application" by M. Auch et al., dated Jan. 16, 2003.
Paper entitled "Ultrathin flexible glass substrates" by A. Plichta et al., dated Mar. 4, 2004.
Patent application entitled "Cement Compositions Containing Flexible, Compressible Beads and Methods of Cementing In Subterranean Formations", by B. Raghava Reddy et al., U.S. Appl. No. 10/350,533, filed on Jan. 24, 2003.
Patent application entitled "Cement Compositions With Improved Mechanical Properties and Methods of Cementing In Subterranean Formation" by Krishna M. Ravi et al., U.S. Appl. No. 10/745,470, filed on Dec. 22, 2003.
Patent application entitled "Cement Compositions Containing Flexible, Compressible Beads and Methods of Cementing In Subterranean Formations" by B. Raghava Reddy et al., U.S. Appl. No. 10/982,028, filed Nov. 5, 2004.
3M Speciality Materials For the Oil & Gas Industry brochure dated Jun. 2001.
3M™ Microspheres brochure dated Sep. 2000.
3M Scotchlite™ Glass Bubbles brochure dated Jul. 1999.
Expancel brochure dated Jan. 2003.
Halliburton brochure entitled "Spherelite Cement Additive" dated 1999.
Expancel brochure dated Jan. 2003.
Jamison, Dale, "Variable Density Treatment Fluids and Methods of Using Such Fluid in Subterranean Formations" filed Jul. 18, 2006 as U.S. Appl. No. 11/489,641.
Zhu et al, "Optimized Indium Tin Oxide Contact for Organic Light Emitting Diode", Thin Solid Films, 363(1,2), 314-317.
Wong et al., "A New Technology for Reducing the Density of Drilling Fluids," Oil & Gas Industry Technical Brief, 3M Specialty Materials.
Office Action mailed Jun. 26, 2008, for U.S. Appl. No. 11/489,641.
Office Action dated Jan. 24, 2008 from U.S. Appl. No. 11/489,641.
Office Action dated Mar. 6, 2006 from U.S. Appl. No. 10/765,510.
Office Action dated Aug. 22, 2005 from U.S. Appl. No. 10/765,510.
U.S. Appl. No. 12/165,760, filed on Jul. 1, 2008.

* cited by examiner

METHODS OF DRILLING WELLBORES USING VARIABLE DENSITY FLUIDS COMPRISING COATED ELASTIC PARTICLES

BACKGROUND OF THE INVENTION

The present invention relates to subterranean treatment fluids. In particular, the present invention relates to variable density subterranean treatment fluid compositions and methods for using such compositions.

A treatment fluid may be used in a subterranean formation in a variety of ways. For example, a fluid may be used to drill a borehole in a subterranean formation, to stimulate a well bore in a subterranean formation, and to clean up a well bore in a subterranean formation, as well as for numerous other purposes. The process of drilling a well typically requires the use of a treatment fluid referred to as a "drilling fluid." During the drilling process, the drilling fluid passes down through the inside of the drill string, exits through the drill bit, and returns to the drill rig through the annulus between the drill string and well bore. The circulating drilling fluid, inter alia, lubricates the drill bit, carries drill cuttings to the surface, and balances the formation pressure exerted on the well bore. Additionally, a properly prepared drilling fluid enhances well drilling safety by preventing "kicks." A kick is an uncontrolled flow of formation fluid into the well bore from the subterranean formation typically resulting from drilling into a zone of higher-than-expected or unanticipated pressure. Kicks may be both dangerous and very costly to drillers. Thus, drilling operators inherently wish to avoid or minimize kicks, or at least detect kicks as early as possible.

Drilling offshore in deep waters requires specially blended drilling fluids which must be carefully formulated to allow for, inter alia, the narrow range of pressure separating the pore pressure from the fracture gradient of the formation. As used herein, the term "pore pressure" refers to the pressure exerted on the borehole by fluids within the formation, while the term "fracture gradient" refers to that pressure that will fracture the formation. Such fracturing of the formation could result in flow of drilling fluids out of the borehole into the formation (commonly referred to as "lost circulation"), or possibly an uncontrolled blowout of the formation fluids, and in some cases, fluids and particulates. Accordingly, the weight of the drilling fluid preferably should be sufficient to balance the pore pressure (and thus provide the necessary protection against kicks) without inadvertently fracturing the sediment and rock around the drill bit.

The formulation of a drilling fluid satisfying these limitations is often complicated because the riser connecting the borehole to the drilling rig must often be quite long, particularly when drilling in deep water applications. As used herein, the term "riser" refers to a length of piping connecting the borehole to the drill ship or drilling rig, through which the drilling fluid is returned to the surface. The length of the riser column could be long, and thus the pressure exerted due to friction and hydrostatic forces could be considerable, even when at relatively shallow depths within the subterranean formation and even when using low density drilling fluids. Further complicating the formulation of the drilling fluid, at subsequent depths the hydrostatic and friction forces may be insufficient to prevent fluid influx from the formation.

Efforts to overcome this difficulty in drilling deep water wells have met with limited success. One proposed solution involves the installation of multiple strings of casing within the borehole to guard against inadvertent fracturing of the formation during the drilling process. This strategy is problematic because the installation of additional casing usually correspondingly reduces the usable diameter of the borehole. Furthermore, the installation of additional strings of casing may add greatly to the expense and complication of completing the well. Another option requires placement of pumps on the ocean floor, wherein drilling fluid exiting the well bore is diverted from the drilling riser annulus into the pumps. Subsequently, the pumps return the drilling fluid to the drill ship through additional pipes. Accordingly, in this method, the pumps remove the weight of the returning drilling fluid from the well bore. However, this method may not achieve desirable results because of the great expense involved in procuring and installing the system of risers and pumps. Another proposed option has been to reduce the density of the drilling fluid as it exits the well bore by injecting hollow rigid spheres into the drilling fluid to reduce the density of the drilling fluid. However, this method is problematic, inter alia, because of the cost and mechanical difficulty of injecting these spheres at the sea floor, and then separating them from the drilling fluid at the surface. Furthermore, the incompressible nature of these rigid spheres tends to cause them to crush at the pressures typically encountered in deepwater drilling; accordingly, such rigid spheres are typically unable to reduce the density of the drilling fluid while it travels upward toward the surface.

Analogous problems exist in other subterranean operations. For example, a fracturing or acidizing operation may involve additional expense in removing the spent fracturing or acidizing fluid from the well bore after the operation is conducted, due in part to the fixed-density nature of such fluids, which may necessitate additional manpower or pumping equipment to remove such fluid in a timely fashion.

SUMMARY OF THE INVENTION

The present invention relates to subterranean treatment fluids. In particular, the present invention relates to variable density subterranean treatment fluid compositions and methods for using such compositions.

An example of a method of the present invention is a method of using a variable density fluid in a subterranean formation comprising introducing a fluid having a density that varies as a function of pressure into the subterranean formation, wherein the fluid comprises a base fluid and a portion of elastic particles. Additional steps may include drilling, completing and/or stimulating a subterranean formation using the variable density fluid; and producing a fluid, e.g., a hydrocarbon fluid such as oil or gas, from the subterranean formation.

Another example of a method of the present invention is a method of drilling, completing and/or stimulating a subterranean formation using a variable density fluid comprising the steps of: introducing a fluid having a density that varies as a function of pressure into the subterranean formation, wherein the fluid comprises a base fluid and a portion of elastic particles, and the elastic particles have an isothermal compressibility factor in the range of from about $1.5 \times 10^{-3}$ (1/psi) to about $1.5 \times 10^{-9}$ (1/psi); and drilling, completing and/or stimulating a subterranean formation using the variable density fluid.

Another example of a method of the present invention is a method of avoiding the loss of circulation of a well fluid in a subterranean formation, comprising the step of adding to the well fluid a portion of elastic particles, the elastic particles being capable of varying in volume with pressure.

One exemplary embodiment of the variable density fluid compositions of the present invention comprises a fluid having a density that varies as a function of pressure comprising: a base fluid; and a portion of elastic particles, the elastic particles having an isothermal compressibility factor in the range of from about $1.5 \times 10^{-3}$ (1/psi) to about $1.5 \times 10^{-9}$ (1/psi).

The features and advantages of the present invention will be readily apparent to those skilled in the art upon a reading of the description of exemplary embodiments, which follows.

DESCRIPTION OF EXEMPLARY EMBODIMENTS

The present invention relates to subterranean treatment fluids. In particular, the present invention relates to variable density subterranean treatment fluid compositions and methods for using such compositions. While the compositions and methods of the present invention are useful in a variety of subterranean applications, they may be particularly useful in deepwater offshore drilling operations. Although described in an offshore environment, the benefits of the present invention may also be appreciated in onshore wells, including, but not limited to, onshore wells that have small differences between pore pressure and fracture gradient.

The variable density fluids of the present invention may vary in density at particular phases of a subterranean operation (e.g., drilling, fracturing, or the like) as may be necessary to adapt to the subterranean conditions to which the fluid will be subjected. For example, where the variable density fluids of the present invention are utilized in offshore drilling applications, the variable density fluid may have a lower density when located above the ocean floor, and subsequently have a higher density when located within the well bore beneath the ocean floor. Generally, the variable density fluids of the present invention will have a density in the range of from about 4 lb/gallon to about 18 lb/gallon when measured at sea level. When utilized in offshore applications, the variable density fluids will generally have a density in the range of from about 6 lb/gallon to about 20 lb/gallon, measured when at a point of maximum compression.

The variable density fluids of the present invention generally comprise a base fluid, and a portion of elastic particles. Other additives suitable for use in subterranean operations also may be added to these compositions if desired.

The base fluid utilized in the variable density fluids of the present invention may be aqueous-based, non-aqueous-based, or mixtures thereof. Where the base fluid is aqueous-based, the water utilized can be fresh water, salt water (e.g., water containing one or more salts dissolved therein), brine (e.g., saturated salt water), or seawater. Generally, the water can be from any source provided that it does not contain an excess of compounds that may adversely affect other components in the variable density fluid. Where the base fluid is non-aqueous-based, the base fluid may comprise any number of organic fluids. Examples of suitable organic fluids include, but are not limited to, mineral oils, synthetic oils, esters and the like. Generally, these organic fluids may generically be referred to as "oils." Where a variable density fluid of the present invention comprises these organic fluids, and is used in drilling operations, such variable density fluids may be referred to as "oil based fluids" or "oil based muds." Generally, any oil in which a water solution of salts can be emulsified may be suitable for use as a base fluid in the variable density fluids of the present invention. Generally, the base fluid may be present in an amount sufficient to form a pumpable variable density fluid. More particularly, the base fluid is typically present in the variable density fluid in an amount in the range of from about 20% to about 99.99% by volume of the variable density fluid. One of ordinary skill in the art with the benefit of this disclosure will recognize the appropriate amount of base fluid to include within the variable density fluids of the present invention in order to provide pumpable variable density fluids.

The variable density fluids of the present invention further comprise a portion of elastic particles. As referred to herein, the term "elastic" will be understood to mean the tendency for a particle to deform or compress under an applied force, and then re-expand as the force is removed, without substantial adverse effect to the structure of the particle. Any elastic particle having a specific gravity in the range of from about 0.05 to about 0.99 that is shear resistant, fatigue resistant and that is substantially impermeable to the fluids typically encountered in subterranean formations may be suitable for use with the variable density fluids of the present invention. Further, the elastic particles will also have an isothermal compressibility factor. As referred to herein, the term "isothermal compressibility factor" will be understood to mean a particle's change in volume with pressure, per unit volume of the particle, while temperature is held constant. Any elastic particle having an isothermal compressibility factor in the range of from about $1.5 \times 10^{-3}$ (1/psi) to about $1.5 \times 10^{-9}$ (1/psi) may be suitable for use with the present invention. Further, to achieve certain beneficial effects of the present invention where the variable density fluids are used in drilling operations, the elastic particles should be able to withstand the rigors of being pumped and/or circulated through a drill bit, e.g., they should be of a size small enough to be pumped and/or circulated through the drill bit and other drilling equipment including the shale shaker, and they should be resistant to the temperatures and pressures that they will encounter during drilling operations. In certain exemplary embodiments where the variable density fluids are used in drilling operations, the elastic particles resist adhering to the drill pipe, the drill bit or the subterranean formation. In certain exemplary embodiments, a portion of the elastic particles may be able to withstand temperatures of up to about 500° F. without degrading. In certain exemplary embodiments, a portion of the elastic particles can withstand pressures of up to about 21,000 psi without crushing, and return to about their original dimensions when pressure is removed.

In certain exemplary embodiments, the elastic particles may comprise an internal fluid. Where the elastic particles comprise an internal fluid, the internal fluid may become incorporated within the elastic particles (so that the elastic particle forms a boundary around the internal fluid) by any means. For example, the internal fluid may be injected into the elastic particle. As another example, the internal fluid may become incorporated within the elastic particle as a consequence of the process of manufacturing the elastic particles. One of ordinary skill in the art with the benefit of this disclosure will recognize an appropriate means by which the internal fluid may become incorporated within the elastic particle. The internal fluid within the elastic particle may comprise air, nitrogen, carbon dioxide, butane, fluorinated hydrocarbons, hydrochlorofluorocarbons, or the like. The preceding list is not intended to be an exhaustive list, but rather is intended merely to provide an illustration of some types of internal fluids which may be suitable for use in accordance with the present invention. Other fluids may also be suitable, and one of ordinary skill in the art with the benefit of this disclosure will be able to identify an appropriate fluid for a particular application.

The presence of an internal fluid within the elastic particles may permit compression and expansion of the elastic particles in a reversible manner, at any point. For example, where the variable density fluids of the present invention are used in subterranean drilling operations, the presence of an internal fluid within the elastic particles permits reversible compression and expansion of the elastic particles, in the well bore, on the ocean floor, or upon return to the drilling rig. Among other benefits, the incorporation of an internal fluid within the elastic particles may permit adjustment of the density of the elastic particles by pre-expanding them to a desired density. In certain exemplary embodiments, the elastic particles may be thermally pre-expanded. In certain exemplary embodiments, the elastic particles may be pre-expanded up to about 40 times their original volume before being added to the variable density fluid. In determining whether or not to heat a particular elastic particle, the benefit from thermally pre-expanding the elastic particle may be weighed against the cost in terms of manpower and energy to achieve such expansion. Further, while thermal pre-expansion may be suitable for certain exemplary embodiments of the elastic particles (e.g., the EXPANCEL particles), other embodiments of the elastic particles may be susceptible to thermal degradation from such heating. One of ordinary skill in the art, with the benefit of this disclosure, will be able to determine whether thermal pre-expansion is appropriate for a particular type of elastic particle. In certain exemplary embodiments where the elastic particles are to be thermally pre-expanded, the temperature to which the elastic particles are heated depends on factors such as, but not limited to, their chemical composition. For example, the glass transition temperature of the polymer used to make the elastic particles could affect the temperature to which the particles are heated. One of ordinary skill in the art, with the benefit of this disclosure, will be able to determine the appropriate temperature to which a particular type of elastic particle may be safely heated for a particular application.

An exemplary embodiment of a suitable elastic particle comprises a polymer that, at a given temperature and pressure, changes volume by expansion and contraction, and consequently, may change the density of the variable density fluid. Suitable polymers may include those which possess sufficient rubbery and elastic characteristics to allow the elastic particles to respond to, inter alia, changes in volume of the internal fluid within the elastic particle at temperatures and pressures commonly encountered in the subterranean formation. In certain exemplary embodiments of the present invention, the elastic particles comprise a copolymer of styrene and divinylbenzene. A commercially available example of elastic particles suitable for use in conjunction with the present invention are elastic particles comprising either a copolymer of styrene and acrylonitrile or a terpolymer of styrene, acrylonitrile and vinylidene chloride, and comprising an internal fluid, such as isobutane or the like. Such elastic particles are commercially available under the trade name "EXPANCEL" from Akzo Nobel, Inc., of Duluth, Ga. Several grades of EXPANCEL elastic particles with different polymer softening temperatures, allowing for expansion and contraction at different temperature ranges, are available. Depending on the conditions of the subterranean formation in which the elastic particles may be placed, a particular grade of EXPANCEL elastic particles may be suitable.

The substantial impermeability of the elastic particles to the variable density fluids of the present invention may also be achieved by appropriately encapsulating or coating a prefabricated elastic particle with appropriate materials. For example, an elastic particle intended for use in, inter alia, a nonaqueous-based drilling fluid may be coated or encapsulated with a hydrophilic material. An elastic particle intended for use in, inter alia, an aqueous-based drilling fluid may be coated or encapsulated with a hydrophobic material. Examples of suitable hydrophobic materials include, inter alia, silanes, silicone polymers, latexes, and the like. Examples of suitable hydrophilic materials include, inter alia, ethylene oxide, propylene oxide, acrylic acid, 2-acrylamido-2-methylpropane sulfonic acid, aminoalkoxysilanes, and the like. The preceding list is not intended to be an exhaustive list, but rather is intended merely to provide an illustration of some types of materials which may be suitable for use in accordance with the present invention. Other materials may also be suitable, and one of ordinary skill in the art with the benefit of this disclosure will be able to identify an appropriate material for a particular application.

The quantity of elastic particles to be included in the variable density fluids of the present invention may be determined based on considerations including, inter alia, the specific gravity and compressibility of the elastic particle. For example, where the variable density fluids are used in subterranean drilling operations, the quantity of elastic particles to be included in the variable density fluid will further depend on additional considerations, including, inter alia, the depth of the ocean floor, the depth of the borehole and the overall volume of the borehole and riser. Generally, when the variable density fluids of the present invention are used in subterranean drilling operations, the elastic particles will be present in the variable density fluid in an amount sufficient so that the density of the fluid may vary such that the variable density fluid provides a desired degree of operational control (e.g., prevents undesirable influx into the well bore of fluids from a region of the subterranean formation surrounding the well bore) when circulating through the subterranean formation, and can return through the riser to the surface without the necessity of additional pumps or subsurface additives. Such additional pumps or additives may be useful, however, if desired. More particularly, the portion of elastic particles will be present in the variable density fluids of the present invention in an amount in the range of from about 0.01% to about 80% by volume of the variable density fluid. One of ordinary skill in the art with the benefit of this disclosure will recognize the appropriate quantity of elastic particles to include within the variable density fluid for a given application, and will also recognize the appropriate balance of base fluid and elastic particles to include within the variable density fluids of the present invention in order to provide pumpable variable density fluids.

Among other benefits, the presence of the elastic particles in the variable density fluids of the present invention allows the density of the variable density fluid to vary as a function of pressure. For instance, as the elastic particles encounter higher downhole pressures, they compress, thereby lowering their volume. The reduction in the volume of the elastic particles in turn increases the density of the variable density fluid. When the elastic particles are fully compressed, certain exemplary embodiments of the variable density fluid will typically have a density in the range of from about 0.01% to about 300% higher than their density measured at sea level. For example, where the variable density fluids of the present invention are used in a subterranean drilling operation, such variable density drilling fluids may flow downward through a drill pipe, exit a drill bit, and recirculate upward through the borehole and into the lower pressure region of a riser connecting the borehole to the surface. Within the riser, the pressure on such variable density drilling fluid decreases, giving rise to a corresponding decrease in the density of the variable density drilling fluid, as the elastic particles begin to expand and increase in volume due to the drop in external pressure. The increase in volume of the elastic particles in turn reduces the overall density of the variable density drilling fluid. In certain preferred embodiments where the variable density fluids are used in a subterranean drilling operation, the resulting drop in density may be sufficient to permit the return of the variable density fluid through the riser to the surface without any additional pumps or subsurface additives.

Among other benefits, the variable density nature of the fluids of the present invention may prove useful in, inter alia, subterranean drilling operations by, inter alia, eliminating the need to lighten a drilling fluid as it returns to the surface through the injection of rigid spheres at the sea floor. The variable density nature of the fluids of the present invention also may eliminate the need for auxiliary pumps located on the sea floor to assist in pumping a returning drilling fluid to the surface. The variable density nature of the fluids of the present invention may also minimize loss of circulation of a drilling fluid into regions of the subterranean formation adjacent to the bore hole, inter alia, because the variable density fluid may be formulated so that its density is sufficient to provide a desired degree of operational control (e.g., prevent undesirable influx into the well bore of fluids from a region of the subterranean formation surrounding the well bore) yet avoid fracturing a region of the subterranean formation. For example, at shallower depths where the formation may be more easily fractured inadvertently, the variable density fluid may have a lower density at such shallower depths, and subsequently have a higher density at greater depths. Among other benefits, this may reduce or eliminate the need to solve the problem of lost circulation by remedial treatment, installing costly additional strings of casing within the well bore, and/or setting plugs and side tracking. The variable density nature of the fluids of the present invention also may impart benefits to onshore wells, as well. For example, when used in onshore wells having a narrow difference between pore pressure and fracture gradient, a drilling fluid comprising a variable density fluid of the present invention may provide a sufficient degree of operation control without fracturing the subterranean formation inadvertently, or without necessitating the installation of casing to prevent such inadvertent fracturing.

In certain preferred embodiments, the variable density fluids of the present invention may permit, inter alia, the drilling of a borehole having a diameter that differs no more than about 25% along the length of the borehole. For instance, in such borehole the bottom diameter of the casing will not differ from the top diameter by more than about 25%. In certain preferred embodiments, the variable density fluids of the present invention may permit, inter alia, the drilling of an offshore borehole having a diameter that is substantially the same along the length of the borehole, e.g., where the diameter of the borehole differs by no more than about 1% to about 5% at any two points along its length. In certain preferred embodiments, the variable density fluids of the present invention may permit, inter alia, the drilling of an offshore borehole comprising strings of casing the substantial majority of which are made from the same piping schedule. In certain preferred embodiments, the variable density fluids of the present invention may permit, inter alia, the drilling of an offshore borehole using a single formulation of the same variable density drilling fluid throughout all phases of the drilling process, e.g., where there is no need to switch drilling fluid formulations while drilling the borehole.

Furthermore, the variable density fluids of the present invention may be used in drilling wells in formations comprising thief zones. As referred to herein, the term "thief zones" will be understood to mean segments of a subterranean formation which are already sufficiently fractured (before or during drilling) as to potentially cause the loss of circulation of drilling fluids out of the well bore into such fractures. Where the variable density fluids of the present invention are used in formations comprising thief zones, a portion of the variable density fluid may flow into such thief zones, and expand under the lower pressures typically found therein to seal them off from the well bore, to prevent further loss of circulation. Lower pressures may exist within the thief zones because, inter alia, such zones may provide a broad flow area and because of frictional losses which may occur as the variable density fluids travel through the formation. One of ordinary skill in the art with the benefit of this disclosure will recognize the amount and type of elastic particles to include within the variable density fluids of the present invention in order to optimize the expansion and sealing capability of the variable density fluid for a particular application.

The use of variable density fluids of the present invention may also benefit other subterranean applications as well. For example, where such variable density fluids are used as fracturing or acidizing fluids, the variable density nature of the fluid may permit easier recovery of the spent fracturing or acidizing fluid from the subterranean formation at the end of the operation, thereby eliminating the need to use additional manpower or pumping equipment to accomplish such task.

The variable density fluids of the present invention also optionally may comprise fixed-density weighting agents. Such fixed-density weighting agents are typically heavy minerals such as barite, ilmenite, calcium carbonate, iron carbonate, or the like. Where used, these fixed-density weighting agents may increase the density of the variable density fluid sufficiently, inter alia, to offset high pressures which may be encountered during certain phases of the drilling operation. In determining the relative amounts of fixed-density weighting agents and elastic particles to add to the variable density fluid to affect the variable density fluid's density, the added expense produced by the use of elastic particles may be considered in light of the degree of improved density control and operability that the resulting variable density fluid may develop through the use of such elastic particles. One of ordinary skill in the art with the benefit of this disclosure will recognize the appropriate balance for a given application. Where used, the fixed-density weighting agents are generally present in the variable density fluid in an amount in the range of from about 0% to about 40% by volume of the base fluid.

The variable density fluids of the present invention also optionally may comprise salts. Examples of suitable salts include soluble salts of Group IA and Group IIA alkali and alkaline earth metal halides, as well as acetates, formates, nitrates, sulfates and the like. As used herein, the terms "Group IA" and "Group IIA" will be understood to mean those elements depicted as belonging to either Group IA or Group IIA, respectively, as shown on the periodic table of the elements found in the endpapers of John McMurry, *Organic Chemistry* (2d. ed. 1988). In certain preferred embodiments, wherein the variable density fluids of the present invention comprise an aqueous base fluid, salts such as sodium chloride, sodium bromide, potassium chloride, sodium formate, and potassium formate are preferred. In certain other preferred embodiments, wherein the variable density fluids of the present invention comprise a non-aqueous base fluid, calcium chloride, potassium chloride, sodium chloride, and sodium nitrate are preferred. One of ordinary skill in the art with the benefit of this disclosure will recognize the appropriate salt for a particular application.

Additional additives may be added to the variable density fluids of the present invention as deemed appropriate by one skilled in the art. Where the variable density fluid comprises an aqueous base fluid, the variable density fluid may further comprise additives such as shale inhibitors, viscosifiers, filtration control agents, pH control agents, and the like. Examples of suitable shale swelling inhibitors include, but are not limited to, polyacrylamides, partially hydrolyzed polyacrylamides, amines, polyglycols and the like. An example of a suitable partially hydrolyzed polyacrylamide is commercially available under the tradename "EZMUD®," from Halliburton Energy Services, Inc., of Houston, Tex. An example of a suitable polyglycol is commercially available under the tradename "GEM," from Halliburton Energy Services, Inc., of Houston, Tex. Examples of suitable viscosifiers include clays, high molecular weight biopolymer polysaccharides, hydroxyethylcellulose, and the like. Examples of suitable clays are a sodium montmorillonite clay commercially available from Halliburton Energy Services, Inc., of Houston, Tex., under the tradename "AQUAGEL®"; and an attapulgite clay commercially available from Halliburton Energy Services, Inc., of Houston, Tex., under the tradename "ZEOGEL®." An example of a suitable high molecular weight biopolymer polysaccharide is commercially available under the tradename "BARAZAN®" from Halliburton Energy Services, Inc., of Houston, Tex. An example of a suitable hydroxyethylcellulose is commercially available from Halliburton Energy Services, Inc., of Houston, Tex., under the tradename "LIQUI-VIS®." In certain preferred embodiments of the variable density fluids of the present invention, BARAZAN® is used as the viscosifier when the variable density fluid comprises an aqueous base fluid. Examples of suitable filtration control agents include starches, modified starches, carboxymethylcellulose, polyanionic cellulose, polyacrylates, and the like. An example of a suitable starch is commercially available from Halliburton Energy Services, Inc., of Houston, Tex., under the tradename "IMPERMEX." An example of a suitable modified starch is commercially available from Halliburton Energy Services, Inc., of Houston, Tex., under the tradename "FILTER-CHEK®." An example of a suitable carboxymethylcellulose is commercially available from Halliburton Energy Services, Inc., of Houston, Tex., under the tradename "CELLEX." An example of a suitable polyanionic cellulose is commercially available from Halliburton Energy Services, Inc., of Houston, Tex., under the tradename "PAC." An example of a suitable polyacrylate is commercially available from Halliburton Energy Services, Inc., of Houston, Tex., under the tradename "POLYAC®." In certain preferred embodiments of the variable density fluids of the present invention, FILTER-CHEK® or PAC is used as the filtration control agent when the variable density fluid comprises an aqueous base fluid. Examples of suitable pH control agents include sodium hydroxide, potassium hydroxide, calcium hydroxide, magnesium oxide, and the like. An example of a suitable source of magnesium oxide is commercially available from Halliburton Energy Services, Inc., of Houston, Tex., under the tradename "BARABUF®." In certain preferred embodiments of the variable density fluids of the present invention, sodium hydroxide or potassium hydroxide is used as the pH control agent when the variable density fluid comprises an aqueous base fluid.

Where the variable density fluids of the present invention comprise a non-aqueous base fluid, the variable density fluids may further comprise additives such as emulsifiers, viscosifiers, filtration control agents, pH control agents, and the like. Examples of suitable emulsifiers include polyaminated fatty acids, concentrated tall oil derivatives, blends of oxidized tall oil and polyaminated fatty acids, and the like. Examples of suitable commercially available polyaminated fatty acids are commercially available from Halliburton Energy Services, Inc., of Houston, Tex., under the tradenames "EZMUL" and "SUPERMUL." An example of a suitable commercially available concentrated tall oil derivative is commercially available from Halliburton Energy Services, Inc., of Houston, Tex., under the tradename "FACTANT." Examples of suitable commercially available blends of oxidized tall oil and polyaminated fatty acids are commercially available from Halliburton Energy Services, Inc., of Houston, Tex., under the tradenames "INVERMUL®" and "LE MUL." Examples of suitable viscosifiers include clays, modified fatty acids, and the like. An examples of a suitable clay is an organophilic clay commercially available from Halliburton Energy Services, Inc., of Houston, Tex., under the tradename "GELTONE." Examples of suitable modified fatty acids are commercially available from Halliburton Energy Services, Inc., of Houston, Tex., under the tradenames "RHEMOD-L" and "TEMPERUS." Examples of suitable filtration control agents include lignites, modified lignites, powdered resins, and the like. An example of a suitable commercially available lignite is commercially available from Halliburton Energy Services, Inc., of Houston, Tex., under the tradename "CARBONOX." An example of a suitable commercially available modified lignite is commercially available from Halliburton Energy Services, Inc., of Houston, Tex., under the tradename "BARANEX." An example of a suitable commercially available powdered resin is commercially available from Halliburton Energy Services, Inc., of Houston, Tex., under the tradename "BARABLOK." Examples of suitable pH control agents include, but are not limited to, calcium hydroxide, potassium hydroxide, sodium hydroxide, and the like. In certain exemplary embodiments wherein the variable density fluids of the present invention comprise a non-aqueous base fluid, calcium hydroxide is a preferred pH control agent.

The elastic particles may be placed within the variable density fluids of the present invention in a variety of ways. For example, where the variable density fluids of the present invention are used in subterranean drilling operations, the elastic particles may be added to the variable density fluid at the surface (e.g., on the drilling rig or drill ship), or through injection below the surface (e.g., by injection into the variable density drilling fluid in the riser), or by any combination of surface and subsurface addition.

While a number of preferred embodiments described herein relate to drilling fluids and compositions, it is understood that any well treatment fluid such as drilling, completion and stimulation fluids including, but not limited to, drilling muds, well cleanup fluids, workover fluids, spacer fluids, gravel pack fluids, acidizing fluids, fracturing fluids, and the like, may be prepared using a variable density fluid. Accordingly, an example of a method of the present invention is a method of using a variable density fluid in a subterranean formation comprising introducing a fluid having a density that varies as a function of pressure into the subterranean formation, wherein the fluid comprises a base fluid and a portion of elastic particles. Additional steps include drilling, completing and/or stimulating a subterranean formation using the variable density fluid; and producing a fluid, e.g., a hydrocarbon fluid such as oil or gas, from the subterranean formation.

An example of a composition of the present invention comprises 70% water by volume of the variable density fluid and 25% elastic particles by volume of the variable density fluid, with the remaining 5% by volume of the variable density fluid comprising a viscosifier, a shale inhibitor, and a fluid loss control additive. Another example of a composition of the present invention comprises 50% mineral oil by volume of the variable density fluid and 25% elastic particles by volume of the variable density fluid, with the remaining 25% by volume of the variable density fluid comprising a viscosifier, a fluid loss control additive, and a salt solution emulsified within the mineral oil.

To facilitate a better understanding of the present invention, the following example of one of the preferred embodiments is given. In no way should such example be read to limit the scope of the invention.

EXAMPLE 1

The effect of the elastic particles on the variable density fluids of the present invention may be illustrated by considering a hypothetical drilling fluid of the present invention comprising 20% elastic particles by volume, the elastic particles having a specific gravity of about 0.41 and an isothermal compressibility factor of about $1.5 \times 10^{-4}$ (1/psi), and further comprising 80% base fluid by volume, the base fluid having a density of about 10 lb/gallon. The following equations may be used to calculate the density of the variable density fluid at different depths.

The change in volume of the elastic particle as the external pressure changes may be determined from the relationship:

$$dv = \left(\frac{\partial v}{\partial p}\right) dp \qquad \text{Equation 1}$$

or $$\frac{dv}{v} = \frac{1}{v}\left(\frac{\partial v}{\partial p}\right) dp = C dp \qquad \text{Equation 2}$$

In Equation 2, the value "C" is the compressibility of the elastic particle. If the elastic particle is subjected to a change in pressure of dp, then the new volume of the elastic particle is given by:

$$V_{new} = V_{old} + dv \qquad \text{Equation 3}$$

and the new density is then calculated.

From the surface to a depth of 2,500 feet, the change in pressure is 1,129 psi, which will cause the volume of the elastic particles to change by 17%, using Equation 2. Using Equation 3, the density at 2,500 feet is then calculated to be 9 lb/gallon. The calculated density of the hypothetical variable density fluid at increasing depths is shown in Table 1 below.

TABLE 1

| Depth (feet) | Equivalent Fluid Density (lb/gallon) |
| --- | --- |
| 0 | 8.7 |
| 2,500 | 9.0 |
| 5,000 | 9.3 |
| 7,500 | 9.7 |
| 10,000 | 10.0 |

Therefore, the present invention is well-adapted to carry out the objects and attain the ends and advantages mentioned as well as those which are inherent therein. While the invention has been depicted, described, and is defined by reference to exemplary embodiments of the invention, such a reference does not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A method of drilling a borehole in a subterranean formation comprising:
   providing a variable density drilling fluid that comprises a base fluid and a plurality of elastic particles, wherein at least one of the elastic particles is coated with a material selected from the group consisting of: a silane, a silicone polymer, a latex, ethylene oxide, propylene oxide, acrylic acid, 2-acrylamido-2-methylpropane sulfonic acid, an aminoalkoxysilane, and a mixture thereof; and
   circulating the variable density drilling fluid into the borehole in the subterranean formation as part of a drilling operation;
   wherein the variable density drilling fluid has a density that varies as a function of the pressure in the subterranean formation.

2. The method of claim 1 wherein the elastic particles further comprise an internal fluid.

3. The method of claim 2 wherein the internal fluid comprises a fluid chosen from the group consisting of: air, nitrogen, carbon dioxide, propane, isobutane, normal butane, normal or branched pentane, ammonia, fluorinated hydrocarbons, hydrochlorofluorocarbons, argon, helium, and mixtures thereof.

4. The method of claim 2 further comprising the step of expanding at least a portion of the elastic particles before placing them into the variable density fluid.

5. The method of claim 4 wherein the step of expanding at least the portion of the elastic particles comprises expanding the portion of elastic particles up to about 40 times their original volume.

6. The method of claim 1 wherein the base fluid comprises a fluid chosen from the group consisting of: water, a non-aqueous fluid, and mixtures thereof.

7. The method of claim 6 wherein the non-aqueous fluid comprises an organic fluid.

8. The method of claim 7 wherein the organic fluid is capable of emulsifying a water solution of salts.

9. The method of claim 7 wherein the organic fluid comprises a fluid chosen from the group consisting of: mineral oils, synthetic oils, esters, and mixtures thereof.

10. The method of claim 1 wherein the subterranean formation is located beneath the ocean floor, or on-shore.

11. The method of claim 10 wherein the density of the variable density fluid increases as the pressure in the subterranean formation increases.

12. The method of claim 11 wherein the density of the drilling fluid in the borehole is in the range of from about 0.01% to about 300% higher than its density at sea level.

13. The method of claim 11 wherein the density of the variable density fluid in the borehole is sufficient to prevent fluid influx from a region of the subterranean formation adjacent to the borehole without fracturing a region of the formation.

14. The method of claim 11 wherein the subterranean formation is located beneath the ocean floor, and wherein the density of the variable density fluid decreases as the variable density fluid travels from the ocean floor to sea level.

15. The method of claim 1 further comprising the step of producing a fluid from the subterranean formation.

16. The method of claim 15 wherein the fluid comprises a fluid chosen from the group consisting of: oil, gas and mixtures thereof.

17. The method of claim 1 wherein the borehole has a diameter that differs no more than about 25% along the length of the borehole.

18. The method of claim 17 wherein the borehole has a diameter that differs no more than about 1% to about 5% at any two points along the length of the borehole.

19. The method of claim 17 wherein the borehole comprises strings of casing wherein substantial majority of the strings are made from a similar piping schedule.

20. The method of claim 1 wherein the variable density fluid is prepared by adding a portion of elastic particles to a fluid above sea level, at sea level, below sea level, or a combination thereof.

21. The method of claim 1 wherein the borehole is in an ocean floor wherein a riser extends from the borehole to about sea level, and wherein a portion of the elastic particles are added to the variable density drilling fluid below sea level by injecting them into the riser.

22. The method of claim 20 wherein the addition of the portion of elastic particles to the fluid reduces the density of the fluid.

23. The method of claim 1 wherein the elastic particles are substantially impermeable to a fluid present in the subterranean formation.

24. The method of claim 1 wherein the method does not comprise a step of circulating a different fluid from the variable density drilling fluid at any point during the drilling of the bore hole.

25. The method of claim 1 wherein a portion of the elastic particles comprises elastic particles comprising a copolymer of styrene and divinylbenzene; a copolymer of styrene and acrylonitrile; or a terpolymer of styrene, vinylidene chloride and acrylonitrile.

26. The method of claim 1 wherein the elastic particles have an isothermal compressibility factor in the range of from about $1.5\times10^{-3}$ (1/psi) to about $1.5\times10^{-9}$ (1/psi).

27. The method of claim 1 wherein the base fluid is present in the variable density fluid in an amount sufficient to form a pumpable fluid.

28. The method of claim 1 wherein the base fluid is present in the variable density fluid in an amount in the range of from about 20% to about 99.99% by volume.

29. The method of claim 1 wherein a portion of the elastic particles is present in the variable density fluid in an amount in the range of from about 0.01% to about 80% by volume of the variable density fluid.

30. The method of claim 1 wherein at least a portion of the elastic particles can withstand pressures up to about 21,000 psi without crushing.

31. The method of claim 1 wherein at least a portion of the elastic particles can rebound to about their original size and shape when pressure is removed.

32. The method of claim 1 wherein at least a portion of the elastic particles can withstand temperatures up to about 500° F. without degrading.

33. The method of claim 1 wherein the variable density fluid further comprises at least one additive chosen from the group consisting of: a salt, a fluid loss additive, a shale swelling inhibitor, an emulsifier, a viscosifier, a pH control agent, a filtration control agent, and a fixed-density weighting agent.

34. The method of claim 1 wherein at least one of the elastic particles has a specific gravity in the range of from about 0.05 to about 0.99.

35. The method of claim 1 wherein the variable density fluid has a density at sea level in the range of from about 4 lb/gallon to about 18 lb/gallon.

36. A method of drilling a borehole in a subterranean formation comprising:
   introducing a variable density drilling fluid having a density that varies as a function of pressure into the subterranean formation, wherein
      the drilling fluid comprises a base fluid and a plurality of elastic particles wherein at least one of the elastic particles is coated with a material selected from the group consisting of: a silane, a silicone polymer, a latex, ethylene oxide, propylene oxide, acrylic acid, 2-acrylamido-2-methylpropane sulfonic acid, an aminoalkoxysilane, and a mixture thereof;
      the elastic particles have an isothermal compressibility factor in the range of from about $1.5\times10^{-3}$ (1/psi) to about $1.5\times10^{-9}$ (1/psi); and
   drilling the borehole in the subterranean formation using the variable density drilling fluid.

37. The method of claim 36 wherein at least one of the elastic particles comprises a copolymer chosen from the group consisting of: styrene and divinylbenzene; a copolymer of styrene and acrylonitrile; and a terpolymer of styrene, vinylidene chloride and acrylonitrile.

38. The method of claim 36 wherein at least one of the elastic particles has a specific gravity in the range of from about 0.05 to about 0.99.

39. A method comprising:
   reducing loss of circulation of a drilling fluid in a subterranean formation, comprising the step of adding to the drilling fluid a plurality of elastic particles, wherein at least one of the elastic particles is coated with a material selected from the group consisting of: a silane, a silicone polymer, a latex, ethylene oxide, propylene oxide, acrylic acid. 2-acrylamido-2 - methylpropane sulfonic acid, an aminoalkoxysilane, and a mixture thereof, the elastic particles being capable of varying in volume with pressure.

40. The method of claim 39 further comprising the step of drilling a borehole in the subterranean formation using the drilling fluid.

41. The method of claim 40 further comprising the steps of:
   permiffing a portion of the drilling fluid to enter openings in a region of the subterranean formation in fluid communication with the borehole; and
   permitting the elastic particles present in the portion of the drilling fluid entering the openings in the region of the subterranean formation to at least partially block off the flow of the drilling fluid through the openings.

42. The method of claim 41 wherein the elastic particles present in the portion of the drilling fluid entering the openings in the region of the subterranean formation expand upon entering the openings.

43. The method of claim 41 wherein the elastic particles are present in the well fluid in an amount in the range of from about 0.0 1% to about 80% by volume of the well fluid.

44. The method of claim 41 wherein at least one of the elastic particles have a specific gravity in the range of from about 0.05 to about 0.99; and wherein at least one of the elastic particles have a compressibility factor in the range of from about $1.5\times10^{-3}$ (1/psi) to about $1.5\times10^{-9}$ (1/psi).

45. The method of claim 41 wherein at least one of the elastic particles comprises a copolymer chosen from the group consisting of: a copolymer of styrene and divinylbenzene; a copolymer of styrene and acrylonitrile; and a terpolymer of styrene, vinylidene chloride and acrylonitrile.

46. The method of claim 39 wherein the elastic particles are present in the well fluid in an amount in the range of from about 0.01% to about 80% by volume of the well fluid.

47. The method of claim 39 wherein at least one of the elastic particles has a specific gravity in the range of from about 0.05 to about 0.99; and wherein at least one of the elastic particles has a compressibility factor in the range of from about $1.5 \times 10^{-3}$ (1/psi) to about $1.5 \times 10^{-9}$ (1/psi).

48. The method of claim 39 wherein at least one of the elastic particles comprises a copolymer chosen from the group consisting of: a copolymer of styrene and divinylbenzene; a copolymer of styrene and acrylonitrile; and a terpolymer of styrene, vinylidene chloride and acrylonitrile.

49. The method of claim 40 wherein the density of the drilling fluid is sufficient to prevent fluid influx from a region of the subterranean formation adjacent to the borehole without fracturing a region of the formation.

* * * * *